(12) United States Patent
Patel et al.

(10) Patent No.: US 10,095,731 B2
(45) Date of Patent: Oct. 9, 2018

(54) DYNAMICALLY CONVERTING SEARCH-TIME FIELDS TO INGEST-TIME FIELDS

(71) Applicant: VMware, Inc., Palo Alto, CA (US)

(72) Inventors: Jay A. Patel, Mountain View, CA (US); Zhenmin Li, Mountain View, CA (US); Chengdu Huang, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 541 days.

(21) Appl. No.: 14/728,292

(22) Filed: Jun. 2, 2015

(65) Prior Publication Data
US 2016/0357809 A1 Dec. 8, 2016

(51) Int. Cl.
*G06G 7/00* (2006.01)
*G06F 17/30* (2006.01)
(52) U.S. Cl.
CPC .. *G06F 17/30395* (2013.01); *G06F 17/30336* (2013.01); *G06F 17/30545* (2013.01)

(58) Field of Classification Search
None
See application file for complete search history.

(56) References Cited

U.S. PATENT DOCUMENTS 9,208,463 B1 * 12/2015 Bhide ............... G06F 17/30572
9,584,374 B2 * 2/2017 Bingham .......... G06F 17/30572
2016/0034490 A1 * 2/2016 Woo ................. G06F 17/30174
707/634

* cited by examiner

*Primary Examiner* — Uyen Le
(74) *Attorney, Agent, or Firm* — Patterson + Sheridan, LLP (57) ABSTRACT

Large amounts of unstructured or semi-structured log data generated by software and infrastructure components of a computing system are processed to identify anomalies and potential problems within the computing system. Stored log messages may be queried and analyzed according to dynamic fields constructed from the content of the log messages. As time goes on, the dynamic fields may be converted into static fields which are extracted and indexed at the time of ingestion of the log messages.

20 Claims, 4 Drawing Sheets

DYNAMICALLY CONVERTING SEARCH-TIME FIELDS TO INGEST-TIME FIELDS

BACKGROUND

System administrators provide virtualized computing infrastructure, which typically includes a plurality of virtual machines executing on a shared set of physical hardware components, to offer highly available, fault-tolerant distributed systems. However, a large-scale virtualized infrastructure may have many (e.g., thousands) of virtual machines running on many of physical machines. High availability requirements provide system administrators with little time to diagnose or bring down parts of infrastructure for maintenance. Fault-tolerant features ensure the virtualized computing infrastructure continues to operate when problems arise, but generates many intermediate states that have to be reconciled and addressed. As such, identifying, debugging, and resolving failures and performance issues for virtualized computing environments have become increasingly challenging.

Many software and hardware components generate log data to facilitate technical support and troubleshooting. However, over an entire virtualized computing infrastructure, massive amounts of unstructured or semi-structured log data can be generated continuously by every component of the virtualized computing infrastructure. As such, finding information within the log data that identifies problems of virtualized computing infrastructure is difficult, due to the overwhelming volume of unstructured or semi-structured log data to be analyzed.

SUMMARY

One or more embodiments disclosed herein provide a method for processing semi-structured data. The method includes storing a first plurality of log messages in a first data store during a first time period, and responsive to receiving a first query having a field, extracting field values for the field from the first plurality of log messages at the time of issuance of the first query. The method further includes storing a second plurality of log messages in a second data store during a second time period subsequent to the first time period, and updating an index of the second data store for the field extracted from the second plurality of log messages at the time of storing the second plurality of log messages. The method includes, responsive to receiving a second query having the field during the second time period, retrieving field values for the field from the index of the second data store.

Further embodiments of the present disclosure include a non-transitory computer-readable storage medium that includes instructions that enable a processing unit to implement one or more of the methods set forth above or the functions of the computer system set forth above.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

Figure 1A:
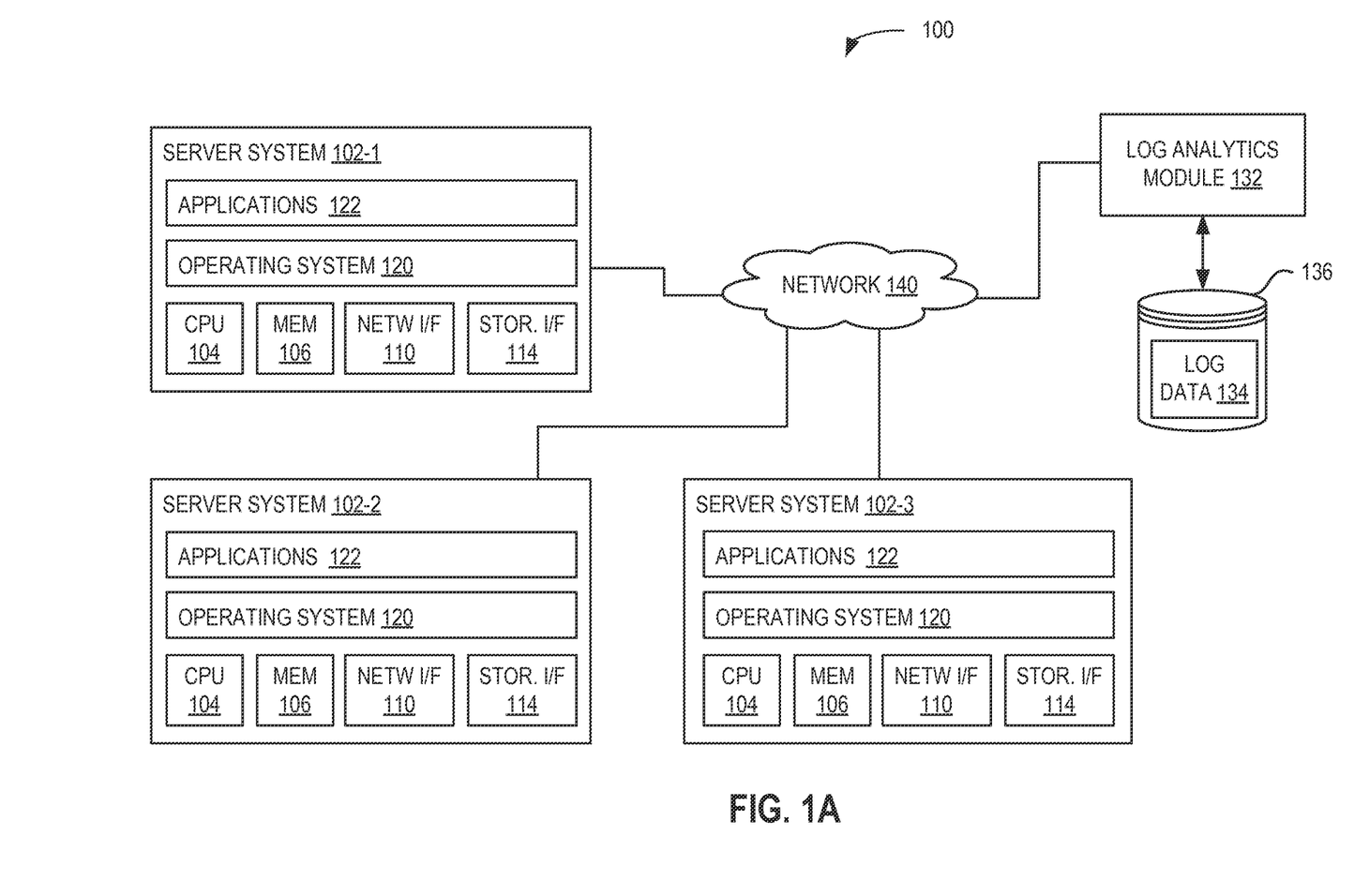
FIG. 1A depicts a block diagram that illustrates a computing system with which one or more embodiments of the present disclosure may be utilized.

FIG. 1A is a block diagram that illustrates a computing system 100 with which one or more embodiments of the present invention may be utilized. As illustrated, computing system 100 includes a plurality of server systems, identified as server system 102-1, 102-2, 102-3, and referred to collectively as servers 102. Each server 102 includes CPU 104, memory 106, networking interface 110, storage interface 114, and other conventional components of a computing device. Each server 102 further includes an operating system 120 configured to manage execution of one or more applications 122 using the computing resources (e.g., CPU 104, memory 106, networking interface 110, storage interface 114).

As mentioned earlier, software and infrastructure components of computing system 100 including servers 102, operating systems 120, and applications 122 running on top of operating system 120, may generate log data during operation. Log data may indicate the state, and state transitions, that occur during operation, and may record occurrences of failures, as well as unexpected and undesirable events. In one embodiment, log data may be unstructured or semi-structured text comprised of a plurality of log messages, such as status updates, error messages, stack traces, and debugging messages. With thousands to millions of different processes running in a complex computing environment, an overwhelming large volume of heterogeneous log data, having varying syntax, structure, and even language, may be generated. As such, finding log messages relevant to the context of a particular issue, as well as proactively identifying emerging issues from log data, can be challenging.

According to one or more embodiments, computing system 100 includes a log analytics module 132 configured to receive and analyze log data 134 from software and infrastructure components of computing system 100. Log analytics module 132 may store log data 134 in one or more data stores, represented by storage 136. Under one approach, log analytics module 132 permits users to send log data 134 with arbitrary fields, as opposed to rigidly adhering to a pre-defined schema in relational databases. These fields may be defined either by transmitting clients, such as software and infrastructure components of computing system 100 (e.g., via an ingestion API), or may be extracted from the content of log data 134 itself using pre-defined parsers on the server-side. Either way, such "static" fields are defined and extracted prior to indexing the data. Static fields may also be referred to ingestion-time fields. Indexing log data 134 allows a user to perform fast analytical queries over the ingested log data 134 because the data is broken up and laid out in a manner that allows for efficient lookups.

However, while indexing allows for fast analytical queries, such an approach may sacrifice flexibility. If a user wants to define a field from log data 134 after ingestion of that log data has already incurred, it may not be possible to do so without re-indexing the log data. Under another approach, log analytics module 132 may support definition of a "dynamic" field at query time. Dynamic fields are typically not indexed, and as such, content of log data must be introspected at query time to extract field values at run time. Dynamics fields may also referred to as search-time fields. As such, the requirement to read the content of the log messages (to extract the dynamic field values) can cause processing queries with dynamic fields to be one to three orders of magnitude (i.e., 10× to 1000×) slower than queries with exclusively static fields.

Accordingly, embodiments of the present disclosure provide a log analytics module 132 configured to query for dynamic fields on log data, and extract and index the dynamic fields as static fields. Log analytics module 132 is configured to dynamically convert the dynamic fields into static fields for currently ingested log data based on the usage and popularity of the dynamic fields. Log analytics module 132 provides a transparent and flexible field definition system that can accelerate performance in the steady state, without sacrificing the flexibility by making fields static at the point of definition. Should a user modify the definition for a field, log analytics module 132 is configured to re-compute the query result for the new field definition using dynamic field extract techniques. The operations of log analytics module 132 are illustrated in greater detail in conjunction with FIG. 2.

Figure 1B:
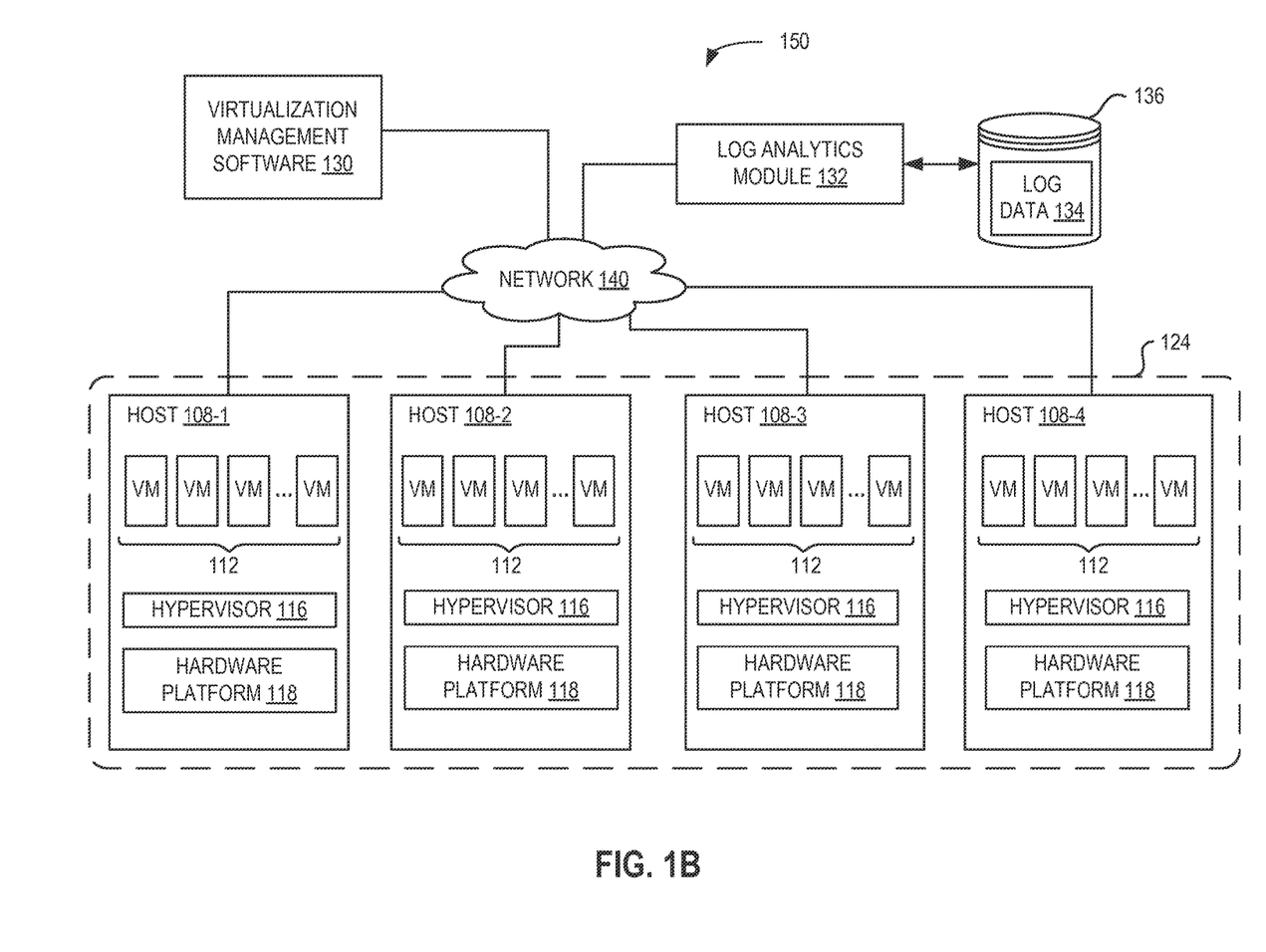
FIG. 1B is a block diagram that illustrates a virtualized computing system with which one or more embodiments of the present disclosure may be utilized.

While embodiments of the present invention are described in conjunction with a computing environment having physical components, it should be recognized that log data 134 may be generated by components of other alternative computing architectures, including a virtualized computing system as shown in FIG. 1B. FIG. 1B is a block diagram that illustrates a computing system 150 with which one or more embodiments of the present disclosure may be utilized. As illustrated, computing system 150 includes a host group 124 of host computers, identified as hosts 108-1, 108-2, 108-3, and 108-4, and referred to collectively as hosts 108. Each host 108 is configured to provide a virtualization layer that abstracts computing resources of a hardware platform 118 into multiple virtual machines (VMs) 112 that run concurrently on the same host 108. Hardware platform 118 of each host 108 may include conventional components of a computing device, such as a memory, processor, local storage, disk interface, and network interface. The VMs 112 run on top of a software interface layer, referred to herein as a hypervisor 116, that enables sharing of the hardware resources of host 108 by the virtual machines. One example of hypervisor 116 that may be used in an embodiment described herein is a VMware ESXi™ hypervisor provided as part of the VMware vSphere® solution made commercially available from VMware, Inc. Hypervisor 116 may run on top of the operating system of host 108 or directly on hardware components of host 108. Each VM 112 includes a guest operating system (e.g., Microsoft Windows®, Linux™) and one or more guest applications and processes running on top of the guest operating system.

In the embodiment shown in FIG. 1B, computing system 150 includes virtualization management software 130 that may communicate with the plurality of hosts 108 via network 140. Virtualization management software 130 is configured to carry out administrative tasks for the computing system 100, including managing hosts 108, managing VMs running within each host 108, provisioning VMs, migrating VMs from one host to another host, and load balancing between hosts 108 of host group 124. In one embodiment, virtualization management software 130 is a computer program that resides and executes in a central server, which may reside in computing system 100, or alternatively, running as a VM in one of hosts 108. One example of a virtualization management software is the vCenter Server® product made available from VMware, Inc. Similar to the software and infrastructure components of computing system 100, the software and infrastructure components of computing system 100, including, host group(s) 124, hosts 108, VMs 112 running on hosts 108, guest operating systems, applications, and processes running within VMs, may generate large amount of log data during operation.

While log analytics module 132 is depicted in FIG. 1B as a separate component that resides and executes on a separate server or virtual machine, it is appreciated that log analytics module 132 may alternatively reside in any one of the computing devices of the virtualized computing system 150, for example, such as the same central server where the virtualization management software 130 resides. In one embodiment, log analytics module 132 may be embodied as a plug-in component configured to extend functionality of virtualization management software 130. Access to the log analytics module 132 can be achieved via a client application (not shown). For example, each analysis task, such as searching for log messages, filtering for log messages, analyzing log messages over a period of time, can be accomplished through the client application. One embodiment provides a stand-alone application version of the client application. In another embodiment, the client application is implemented as a web browser application that provides management access from any networked device.

Figure 2:
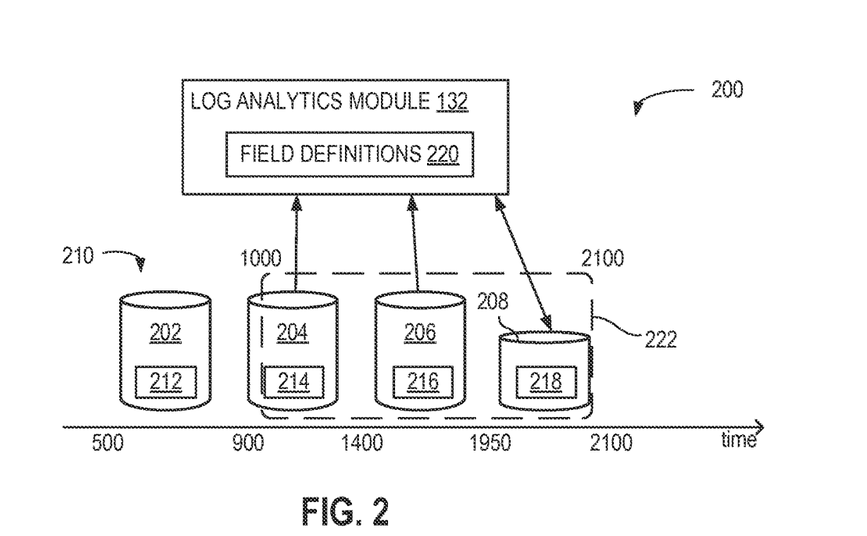
FIG. 2 is a block diagram that illustrates log data of a computing infrastructure across time with respect to data ingestion of log data, according to one embodiment of the present disclosure.

FIG. 2 is a block diagram that illustrates log data 134 of a computing infrastructure across time with respect to data ingestion of log data 134, according to one embodiment of the present disclosure. It should be recognized that, even though the process is described in conjunction with the system of FIG. 1A, any system configured to perform the illustrated technique is within the scope of embodiments of the disclosure. In the embodiment shown, log analytics module 132 stores log data in a series of "buckets" 210, which include a data store (e.g., store 202) and an associated index (e.g., index 212). In one implementation, the data stores may be append-only files, and the associated index may include an inverted index and field store, although other index designs and data structures may be used.

As new log data is received by log analytics module 132, the raw log data is saved to a current data store (e.g., append-only file) and the associated index is updated to accommodate the new log messages. However, once a bucket reaches a threshold size, log analytics module 132 seals the bucket by making the data store and associated index read-only. At this point onward, incoming log data is written to another, newly instantiated bucket. In the example shown in FIG. 2, when data store 206 filled up to the threshold size, data store 206 and the associated index 216 were modified to be read-only, and a new empty bucket having a data store 208 and associated index 218 are instantiated. The read-only property of data stores 204 and 206 are depicted in FIG. 2 with uni-directional arrows, and the append property of the latest data store 208 is represented with a bi-directional arrow. It is noted that other techniques for compartmentalizing log data 134 into buckets other than size limits may be used, for example, such as based on time of receipt. In an alternative embodiment, buckets of log messages may be sealed after a threshold period of time has elapsed.

In one embodiment, log analytics module 132 may store one or more field definitions 220 that specify how certain portions of log data may be parsed and analyzed by queries. For example, log analytics module 132 may generate (in response to user input) a field definition 220 having a field name and a parsing rule used to extract a value for the field from log data. Subsequent queries issued by a user may reference the defined field by the field name. Field values for the field are extracted from log messages according to the definition of the field.

In one embodiment, for any analytics query that overlaps a bucket's time range, log analytics module 132 has to analyze that bucket's data store. A bucket 210 has a time range that spans an earliest arriving log message to the latest arriving log message. In the example shown in FIG. 2, the first bucket with data store 202 has a time range spanning from approximately t=500 to t=900; the second bucket of data store 204 spans approximately t=900 to t=1400; the third bucket, from t=1400 to t=1950; and the fourth most recent bucket from t=1950 onward. As such, to process data for a query, log analytics module 132 first locates the relevant buckets, then splits the query into sub-queries, and runs the sub-queries on each relevant bucket (in parallel). As an example, FIG. 2 depicts a user query (represented by a window 222) that requires data analysis between t=1000 and t=2100, which is split into three sub-queries (one per bucket) for data stores 204, 206, and 208.

As previously mentioned, when a bucket is sealed, log analytics module 132 creates a new bucket to house newly arriving log data 134. At the point of bucket creation, log analytics module 132 is configured to determine which of the dynamic fields are "expensive" and convert those dynamic fields to static fields for the new bucket (e.g., data store 208). At time of ingestion, log analytics module 132 attempts to extract values for the dynamic fields and index the field values as static fields in the new index 218. Until the new bucket is sealed, log analytics module 132 may use the same set of converted static fields for updating index 218. Accordingly, when a user issues a query with a dynamic field, log analytics module 132 converts the dynamic field to a static field on a per-bucket basis.

In one embodiment, the expensiveness of a dynamic field may change over time depending on the queries executed by log analytics module 132. If a dynamic field becomes inexpensive, log analytics module 132 might no longer convert that dynamic field to a static field for new buckets. If an analytics query uses a dynamic field on a bucket that did not index the field (e.g., via conversion), log analytics module 132 may fall back to the traditional behavior and extract the dynamic field value directly from log data. Stated differently, a field can wax and wane in expense, without any impact on correctness. Whenever a field is popular during bucket creation time, the performance of querying for that field is accelerated. In one embodiment, log analytics module 132 saves the definition of a dynamic field when the field is indexed for a batch of log data. Should a user change the definition of the dynamic field, log analytics module 132 may disregard that static field and fallback to extracting the field values as a dynamic field, thereby preserving correctness.

For example, in the embodiment shown in FIG. 2, at approximately t=1600, log analytics module 132 stored a first plurality of log messages in a first data store 206 during a first time period, i.e., from t=1400 to 1950. As such, responsive to receiving a first query having a field during this first time period, log analytics module 132 would extract field values for the field from the first plurality of log messages at the time of issuance of the first query. At some subsequent time, log analytics module 132 received a second plurality of log messages during a second time period subsequent to the first time period, i.e., t=1950 and onward. It is contemplated that at this point, the first data store 206 has reached its size limit and been sealed as read-only. Log analytics module 132 stores the second plurality of log messages in a second data store 208 and updates an index 218 of the second data store 208 for the field extracted from the second plurality of log messages at the time of storing the second plurality of log messages. In response to receiving a second query having the field during the second time period, log analytics module 132 executes the second query by retrieving field values for the field from index 218 associated with the second data store 208.

Figure 3:
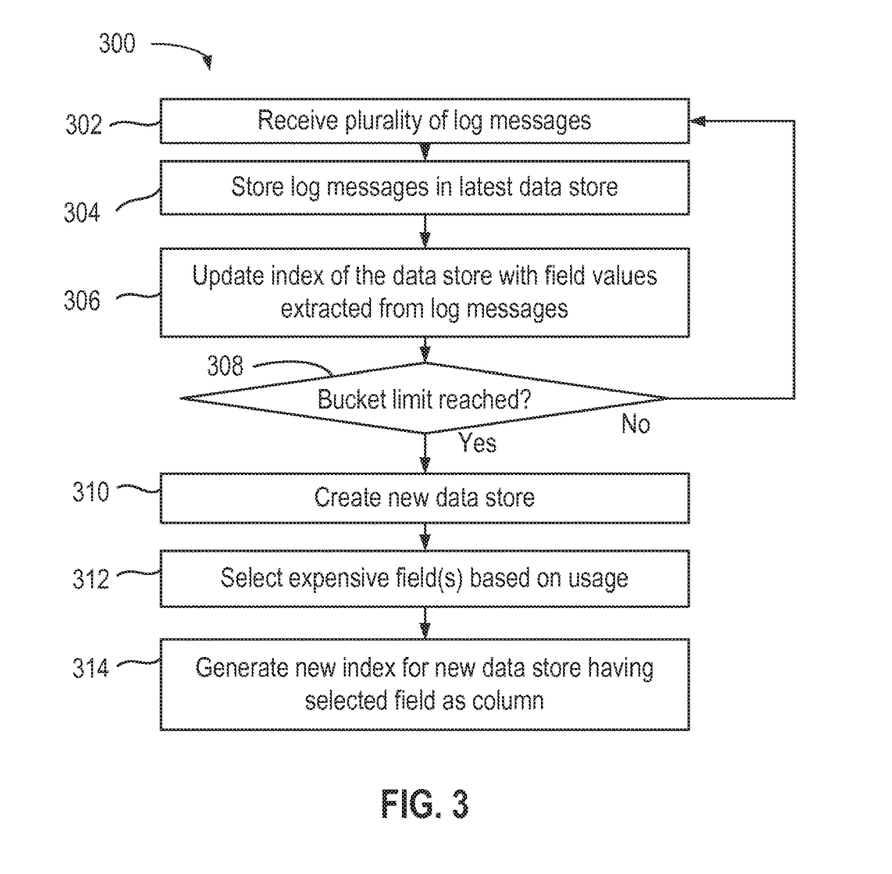
FIG. 3 is a flow diagram that illustrates steps for a method for processing log messages for a computer infrastructure, according to an embodiment of the present disclosure.

FIG. 3 is a flow diagram that illustrates steps for a method 300 for processing log messages for a computer infrastructure, according to an embodiment of the present disclosure. It should be recognized that, even though the method 300 is described in conjunction with the system of FIGS. 1A and 1B, any system configured to perform the method steps is within the scope of embodiments of the disclosure.

The method 300 begins at block 302, where log analytics module 132 receives a stream of log data 134 generated by software and infrastructure components of computing system 100. As described above, log data 134 may include a plurality of log messages. In some embodiments, log analytics module 132 may be configured to retrieve log data (e.g., log files) from software and infrastructure components of computing system 100, including applications 122, operation systems 120, and in the case of virtualized computing system 150, components such as hypervisors 116, guest application and operating systems running within VMs 112. In other embodiments, software and infrastructure components of computing system 100 may be configured to write log files to a common destination, such as an external storage, from which log analytics module 132 may periodically retrieve log data. In some embodiments, log data 134 may be transferred over network 140 directly to log analytics module 132. By way of example, a log message may include a time stamp (e.g., "2015 Mar. 23 13:30") indicating a date and time corresponding to the creation of the log message and a text description (e.g., "dbhost1 completed transaction 000523821 in 0.521 seconds").

At block 304, log analytics module 132 stores the received log data 134 in a data store. As described earlier, storage for log data 134 may be compartmentalized into a series of buckets, each bucket corresponding to log messages ingested in a given time period. In one implementation, all but the latest bucket is marked as read-only, and newly ingested log data 134 is appended to the latest bucket.

At block 306, log analytics module 132 extracts field values from the plurality of log messages (of received log data 134) according to one or more user-defined parsing rules, and updates an index of the latest data store with the extracted field values. These field values may be referred to as ingestion-time fields because the fields were extracted at the time of storing the received log messages. In one embodiment, the user-defined parsing rules are part of definitions for user-defined fields. A definition for a field may include a field name and a parsing rule used for extracting a value from a log messages. For example, a user can specify a field name "date_received" for a date time stamp of a log message and a parsing rule for the date_received field as a regular expression configured to match a date time format at the beginning of a log message. In another example, for log messages similar to the example log message "2015 Mar. 23 13:30 dbhost1 completed transaction 000523821 in 0.521 seconds," a user can specify a "transaction time" field and associated parsing rule to extract the value "0.521 seconds" from such log messages. Any known techniques for parsing rules and searching patterns may be utilized.

In one embodiment, log analytics module 132 stores the field values extracted from the log messages under an internal column for the field in the index of second data store. The name of the internal column may be based on a transformation of the field name and the parsing rule of the definition of the field. For example, the text of the field name and the associated parsing rule may be concatenated and hashed to form a unique internal column name. In some embodiments, "internal" columns are not generally exposed to users or intended for explicit user reference, as reflected by an otherwise complex field name that may be difficult for users to reference.

At block 306, log analytics module 132 determines whether a threshold has been reached for the current data store of log messages. In one embodiment, the threshold may be a maximum size of a data store for storing log messages (e.g., 100 MB, or 1 GB); in other embodiments, the threshold may be a maximum time range between log messages in a same data store (e.g., 2 hrs, or 7 days). If the threshold has not been reached, log analytics module 132 may return to block 302, and continue to process incoming log messages.

At block 310, responsive to determining that the current data store has reached the threshold, log analytics module 132 seals the current data store by modifying the current data store to be read-only. Log analytics module 132 instantiates a new data store for storing log messages.

At block 312, log analytics module 132 selects a field from a plurality of saved fields for conversion from a search-time field to an ingestion-time field based on usage of the field in prior time periods. In one embodiment, log analytics module 132 determines a user-defined field has been frequently used in queries issued in prior time period (s). In other embodiments, log analytics module 132 selects a particular user-defined field based on a determination that a significant amount of time has been spent extracting values for the particular user-defined field as a search-time field.

It is noted that in addition to converting search-time fields to ingestion-time fields, log analytics module 132 may do the converse action. That is, log analytics module 132 may convert ingestion-time fields that have been indexed in one data store, and cease extracting those fields at ingestion-time in the next data store. In one embodiment, log analytics module 132 selects an ingestion-time field from a plurality of saved fields for conversion to a search-time field based on usage of the ingestion-time field in the first time period. The ingestion-time field can be a column in an index of the first data store. When generating the index for the next data store, log analytics module 132 generates the index of the next data store to not have the ingestion-time field as a column in the index of the second data store.

At block 314, log analytics module 132 generates an index of newly created data store having the selected field as a column in the index. In one implementation, log analytics module 132 transforms the field name and the associated parsing rule into a unique internal column name for the field within the index.

Figure 4:
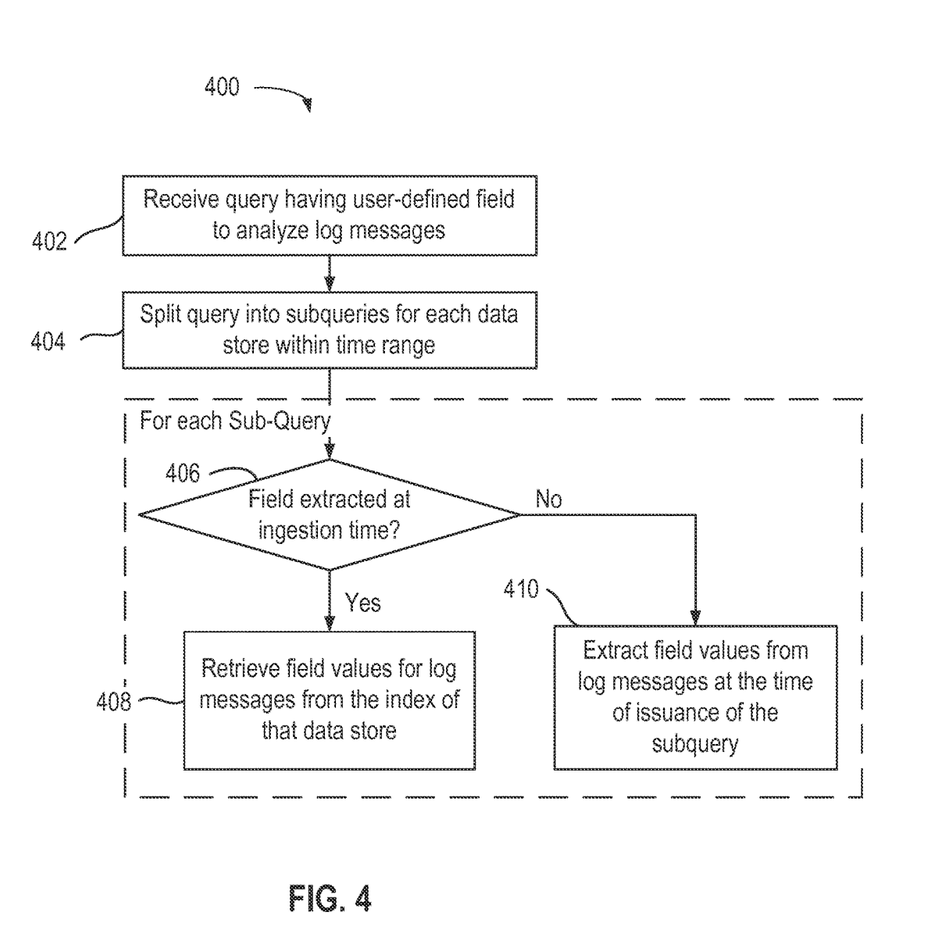
FIG. 4 is a flow diagram that illustrates steps for a method for analyzing log messages for a computer infrastructure, according to an embodiment of the present disclosure.

FIG. 4 is a flow diagram that illustrates steps for a method 400 for analyzing log messages for a computer infrastructure, according to an embodiment of the present disclosure. It should be recognized that, even though the method 400 is described in conjunction with the system of FIGS. 1A and 1B, any system configured to perform the method steps is within the scope of embodiments of the disclosure.

At block 402, log analytics module 132 receives a query issued by a user to analyze a plurality of stored log messages. In one embodiment, the query may specify one or more user-defined fields and may further specify a time range. For example, a user may issue a query to search for any log messages within the last 24 hours which report a transaction time greater than 1 second using a query condition "'transaction_time'<1 second", where "transaction time" is a user defined field.

At block 404, log analytics module 132 splits the query into multiple sub-queries, one sub-query for each data store falling within the specified time range. For example, if the query specifies a time range that includes a first time period and a second time period, log analytics module 132 splits the query into a first sub-query for a first data store associated with the first time period, and a second sub-query for a second data store associated with the second time period.

For each sub-query (associated with a given data store), and for each field in the sub-query, at block 406, log analytics module 132 determines whether the index of the given data store contains the field. In one embodiment, log analytics module 132 determines whether the index has the requested field (i.e., is an ingestion-time field) by checking the index for a certain column name. In one implementation, log analytics module 132 may determine that an internal column for the field does not exist in the index of the data store having a name based on a transformation of the field name and the parsing rule.

At block 408, responsive to determining that the index of the given data store contains the field, log analytics module 132 retrieves field values for the field from the index of the given data to resolve the sub-query. Otherwise, at block 410, responsive to determining the index of the given data store does not contain the field, log analytics module 132 extracts field values for the field from the plurality of log messages stored in the given data store at the time of issuance of the sub-query. That is, in some embodiments, log analytics module 132 determines whether the specified field in a analytical query is an ingestion-time field or a search-time field. If an ingestion-time field, log analytics module 132 performs the query using the index, thereby accelerating performance of the search. Otherwise, log analytics module 132 falls back to dynamic field techniques and performs the query by extracting field values from log messages dynamically at search-time. Such a scenario of mixed ingestion-time fields and search-time fields can readily occur in situations where a query spans time periods in which log analytics module 132 had converted a search-time field to an ingestion time field.

In another scenario, log analytics module 132 may have modified, in response to user input, the parsing rule associated with an ingestion-time field. For example, the user might have refined the parsing rule for the example "transaction time" (ingestion-time) field to match "milliseconds" instead of just "seconds." While the "transaction time" field name remains unchanged, the modified parsing rule is saved field definitions 220. Should log analytics module 132 receive another query Q3 for the "transaction time" field, log analytics module 132 would determine that the index of the current data store does not contain the field based on a transformation of the field name and now-modified parsing rule. In such a case, log analytics module 132 would fallback to the behavior of extracting field values for the field from the plurality of log messages stored in the given data store at the time of issuance of the query Q3. In effect, log analytics module 132 disregards any old ingestion-time fields that may have been properly indexed, and fall back to executing the query with search-time fields.

At block 412, log analytics module 132 combines a return set comprised of a first set of field values extracted from a first plurality of log messages (stored in a first data store) at the time of issuance of the first sub-query and a second set of field values retrieved from the index of a second data store storing a second plurality of log messages.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for processing semi-structured data comprising:
storing a first plurality of log messages in a first data store during a first time period;
responsive to receiving a first query having a field, extracting first field values for the field from the first plurality of log messages at the time of issuance of the first query;
storing a second plurality of log messages in a second data store during a second time period subsequent to the first time period;
updating an index of the second data store for second field values for the field extracted from the second plurality of log messages at the time of storing the second plurality of log messages; and
responsive to receiving a second query having the field during the second time period, retrieving the second field values for the field from the index of the second data store.

2. The method of claim 1, further comprising:
generating a definition of the field comprising a field name and one or more parsing rules; and
wherein the first and second field values for the field are extracted from the first and second plurality of log messages, respectively, according to the definition of the field.

3. The method of claim 2, wherein updating the index of the second data store for the second field values extracted from the second plurality of log messages at the time of storing the second plurality of log messages further comprises:
storing the second field values extracted from the second plurality of log messages under an internal column for the field in the index of the second data store, wherein a name of the internal column is based on a transformation of the field name and the parsing rule of the definition of the field.

4. The method of claim 2, further comprising:
modifying, in response to user input, the parsing rule associated with the field;
receiving a third query for the field during the second time period;
responsive to determining that the index of the second data store does not contain the field, extracting the second field values for the field from the second plurality of log messages at the time of issuance of the third query.

5. The method of claim 4, wherein determining that the index of the second data store does not contain the field further comprises:
   determining that an internal column for the field does not exist in the index of the second data store having a name based on a transformation of the field name and the modified parsing rule.

6. The method of claim 1, further comprising:
   responsive to determining the first data store has reached a threshold size:
      modifying the first data store to be read-only;
      instantiating the second data store for storing the second plurality of log messages;
      selecting the field from a plurality of saved fields for conversion from a search-time field to an ingestion-time field based on usage of the field in prior time periods; and
      generating the index of the second data store having the field as a column in the index.

7. The method of claim 1, further comprising:
   selecting an ingestion-time field from a plurality of saved fields for conversion to a search-time field based on usage of the ingestion-time field in the first time period, wherein the ingestion-time field is a column in an index of the first data store; and
   generating the index of the second data store not having the ingestion-time field as a column in the index of the second data store.

8. The method of claim 1, wherein the second query specifies a time range including the first and second time periods, and
   wherein responsive to receiving the second query having the field during the second time period, retrieving the second field values for the field from the index of the second data store further comprises:
      splitting the second query into a first sub-query of the first data store and a second sub-query of the second data store; and
      combining a return set comprised of a first set of field values extracted from the first plurality of log messages at the time of issuance of the first sub-query and a second set of field values retrieved from the index of the second data store.

9. A non-transitory computer-readable storage medium comprising instructions that, when executed in a computing device, process semi-structured data, by performing the steps of:
   storing a first plurality of log messages in a first data store during a first time period;
   responsive to receiving a first query having a field, extracting first field values for the field from the first plurality of log messages at the time of issuance of the first query;
   storing a second plurality of log messages in a second data store during a second time period subsequent to the first time period;
   updating an index of the second data store for second field values for the field extracted from the second plurality of log messages at the time of storing the second plurality of log messages; and
   responsive to receiving a second query having the field during the second time period, retrieving the second field values for the field from the index of the second data store.

10. The non-transitory computer-readable storage medium of claim 9, wherein the steps further comprise:
   generating a definition of the field comprising a field name and one or more parsing rules;
   wherein the first and second field values for the field are extracted from the first and second plurality of log messages, respectively, according to the definition of the field.

11. The non-transitory computer-readable storage medium of claim 10, wherein updating the index of the second data store for the second field values extracted from the second plurality of log messages at the time of storing the second plurality of log messages further comprises:
   storing the second field values extracted from the second plurality of log messages under an internal column for the field in the index of the second data store, wherein a name of the internal column is based on a transformation of the field name and the parsing rule of the definition of the field.

12. The non-transitory computer-readable storage medium of claim 10, wherein the steps further comprise:
   modifying, in response to user input, the parsing rule associated with the field;
   receiving a third query for the field during the second time period;
   responsive to determining that an internal column for the field does not exist in the index of the second data store having a name based on a transformation of the field name and the modified parsing rule, extracting the second field values for the field from the second plurality of log messages at the time of issuance of the third query.

13. The non-transitory computer-readable storage medium of claim 9, wherein the steps further comprise, responsive to determining the first data store has reached a threshold size:
   modifying the first data store to be read-only;
   instantiating the second data store for storing the second plurality of log messages;
   selecting the field from a plurality of saved fields for conversion from a search-time field to an ingestion-time field based on usage of the field in prior time periods; and
   generating the index of the second data store having the field as a column in the index.

14. The non-transitory computer-readable storage medium of claim 9, wherein the steps further comprise:
   selecting an ingestion-time field from a plurality of saved fields for conversion to a search-time field based on usage of the ingestion-time field in the first time period, wherein the ingestion-time field is a column in an index of the first data store; and
   generating the index of the second data store not having the ingestion-time field as a column in the index of the second data store.

15. The non-transitory computer-readable storage medium of claim 9, wherein the second query specifies a time range including the first and second time periods, and
   wherein responsive to receiving the second query having the field during the second time period, retrieving the second field values for the field from the index of the second data store further comprises:
      splitting the second query into a first sub-query of the first data store and a second sub-query of the second data store;
      combining a return set comprised of a first set of field values extracted from the first plurality of log messages at the time of issuance of the first sub-query and a second set of field values retrieved from the index of the second data store.

16. A computer system for processing semi-structured data for a computer infrastructure, the computer system comprising:
a system memory;
a storage device having a plurality of data stores and associated indexes; and
a processor programmed to carry out the steps of:
storing a first plurality of log messages in a first data store of the plurality of data stores during a first time period;
responsive to receiving a first query having a field, extracting first field values for the field from the first plurality of log messages at the time of issuance of the first query;
storing a second plurality of log messages in a second data store of the plurality of data stores during a second time period subsequent to the first time period;
updating an index of the second data store for second field values for the field extracted from the second plurality of log messages at the time of storing the second plurality of log messages; and
responsive to receiving a second query having the field during the second time period, retrieving the second field values for the field from the index of the second data store.

17. The computer system of claim 16, wherein the processor is further programmed to carry out the steps comprising:
generating a definition of the field comprising a field name and one or more parsing rules, wherein the first and second field values for the field are extracted from the first and second plurality of log messages, respectively, according to the definition of the field.

18. The computer system of claim 17, wherein the processor is further programmed to carry out the steps of updating the index of the second data store for the second field values extracted from the second plurality of log messages at the time of storing the second plurality of log messages is further programmed to carry out the steps of:
storing the second field values extracted from the second plurality of log messages under an internal column for the field in the index of the second data store, wherein a name of the internal column is based on a transformation of the field name and the parsing rule of the definition of the field.

19. The computer system of claim 16, wherein the processor is further programmed to carry out the steps comprising:
selecting an ingestion-time field from a plurality of saved fields for conversion to a search-time field based on usage of the ingestion-time field in the first time period, wherein the ingestion-time field is a column in an index of the first data store; and
generating the index of the second data store not having the ingestion-time field as a column in the index of the second data store.

20. The computer system of claim 16, wherein the processor is further programmed to carry out the step of:
wherein the second query specifies a time range including the first and second time periods, and
wherein responsive to receiving the second query having the field during the second time period, retrieving the second field values for the field from the index of the second data store further comprises:
splitting the second query into a first sub-query of the first data store and a second sub-query of the second data store; and
combining a return set comprised of a first set of field values extracted from the first plurality of log messages at the time of issuance of the first sub-query and a second set of field values retrieved from the index of the second data store.

* * * * *